(12) United States Patent
Foster et al.

(10) Patent No.: US 6,405,840 B1
(45) Date of Patent: Jun. 18, 2002

(54) RIGID PANEL ATTACHMENT FOR BRAKE LININGS

(75) Inventors: Steven R. Foster, Fort Mill; William D. Hays, Jr., Rock Hill, both of SC (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/443,853

(22) Filed: Nov. 19, 1999

(51) Int. Cl.[7] ............................................. F16D 69/00
(52) U.S. Cl. ........................ 188/250 B; 188/250 E; 188/258; 188/73.36
(58) Field of Search .................. 188/250 B, 250 D, 188/250 E, 250 F, 250 G, 250 R, 251 R, 252, 253, 255, 256, 258, 261, 73.1, 73.36, 73.37

(56) References Cited

U.S. PATENT DOCUMENTS

| 1,880,750 A | * | 10/1932 | Brackett ................ 188/250 G |
| 3,490,563 A |   | 1/1970  | Hahm |
| 4,569,424 A | * | 2/1986  | Taylor, Jr. .............. 188/250 G |
| 4,640,390 A | * | 2/1987  | Saumweber et al. ..... 188/73.37 |
| 5,123,514 A | * | 6/1992  | Gatins, Jr. ............. 192/107 M |
| 5,255,762 A | * | 10/1993 | Beri ...................... 188/250 |
| 5,355,986 A | * | 10/1994 | Biswas ................... 188/258 |
| 5,429,216 A |   | 7/1995  | Kahr |
| 5,515,950 A | * | 5/1996  | Kwolek .................. 188/73.36 |
| 5,730,257 A | * | 3/1998  | Clark .................... 188/73.1 |
| 5,732,800 A | * | 3/1998  | Spigener ................. 188/234 |
| 5,839,550 A | * | 11/1998 | Redgrave et al. ........ 188/250 D |
| 5,842,546 A | * | 12/1998 | Biswas .................. 188/73.37 |
| 6,116,384 A | * | 9/2000  | Matsumoto et al. ...... 188/73.31 |

FOREIGN PATENT DOCUMENTS

| EP | 0212925 | 3/1987 |
| EP | 0756100 | 1/1997 |
| JP | 8021462 | 1/1996 |

\* cited by examiner

*Primary Examiner*—Paul N. Dickson
*Assistant Examiner*—Xuan Lan Nguyen
(74) *Attorney, Agent, or Firm*—Carlson, Gaskey & Olds

(57) ABSTRACT

A brake lining assembly for a wheel brake of a vehicle braking system includes a backing plate and a friction pad overlying the backing plate. An engagement panel is disposed between the backing plate and the friction pad for securing the friction pad to the backing plate. The engagement panel includes a plurality of engagement apertures to secure the friction material to the backing plate. The surface area of the panel is greater than the space defined by the engagement apertures. The panel thus forms a rigid frame for the friction pad, and provides structural support.

16 Claims, 3 Drawing Sheets

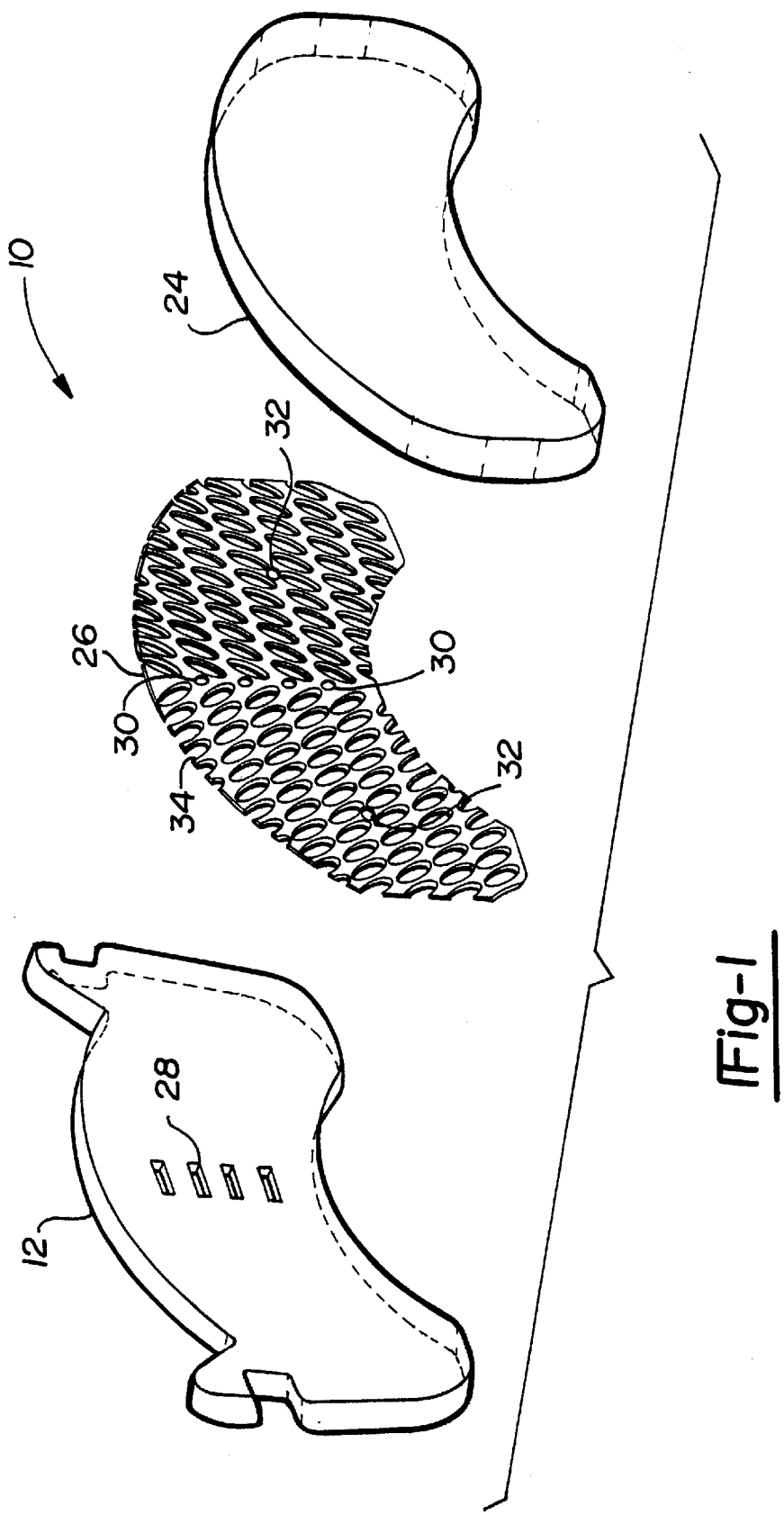

RIGID PANEL ATTACHMENT FOR BRAKE LININGS

BACKGROUND OF THE INVENTION

The subject invention relates to an improved brake lining assembly. More specifically, the invention relates to an improved attachment for a friction pad.

As known, a brake lining assembly typically includes a friction pad that engages a brake disc for stopping a vehicle. The assembly is actuated by a piston, which is secured to a caliper. When the assembly is actuated, the friction pad contacts the brake disc, which rotates with a vehicle wheel. The friction pad is secured to a backing plate that contacts the piston.

In some friction pads, a wire screen has been welded to the backing plate, and is disposed between the backing plate and the friction pad. The wire screen is much like window screen material and is mostly open space. Thus, the screen is flexible. During assembly, the backing plate, with the screen, is inserted into a mold tool and the friction pad is molded onto the screen securing the friction pad to the backing plate. Because the screen is flexible it does not provide structural support to the pad. Therefore, the screen does not significantly enhance the working life of the friction pad, but merely functions as an attachment.

As known, the contact between the friction pad and the brake disc slowly grinds down the friction pad until the pad needs to be replaced. In addition to wearing down, the friction pad tends to crack and chip when stresses caused while stopping the vehicle are absorbed by the friction pad. Even though the friction pad may have a substantial working life left, cracks and chips may reduce the pad's overall effectiveness resulting in required replacement. The mesh screen does not provide any structural support to the friction pad, and since it is flexible it does not absorb the forces introduced to the friction pad while braking.

Therefore, a need exists for an improved attachment for the friction pad that will absorb stresses upon the friction pad, enhancing the durability and working life of the friction pad.

SUMMARY OF THE INVENTION AND ADVANTAGES

A brake lining assembly of a vehicle braking system includes a backing plate and a friction pad overlaying the backing plate. An engagement panel is disposed between the backing plate and the friction pad for securing the friction pad to the backing plate. The engagement panel includes a plurality of engagement apertures disposed therein with the surface area of the panel being greater than the space defined by the engagement apertures. The panel forms a rigid frame for the friction pad for providing structural support to the friction pad.

The engagement apertures form opposing acute and obtuse patterns of rows spaced on opposed sides of a centerline of the panel. The pattern is generally symmetrical and extends in opposed directions about the centerline spreading any forces on the panel to opposed sides of the centerline. This tends to cancel the forces introduced to the friction pad during braking.

In addition to securing the friction pad to the backing plate, the engagement panel provides structural support to the friction pad. The rigid engagement panel stiffens the friction pad and absorbs stresses introduces to the friction pad while the friction pad is in contact with a brake disc. The engagement panel reduces the potential for cracking of the friction pad thereby improving the durability and working life of the friction pad.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is an exploded view of the brake lining assembly of the subject invention;

DETAILED DESCRIPTION OF THE PREFERRED EMBODIMENT

Figure 2A:
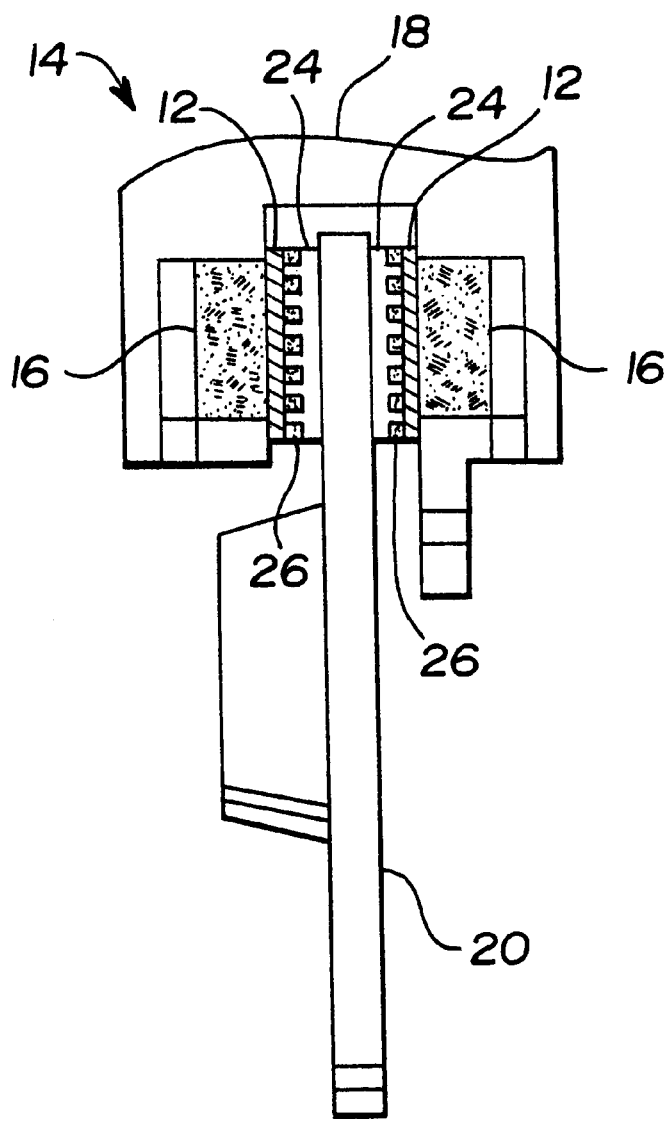
FIG. 2a is a sectional view of a vehicle wheel brake system showing the brake lining assembly of the subject invention.

Referring to FIG. 1, an exploded view of an inventive brake disc assembly for a wheel brake of a vehicle braking system is generally shown at 10. The assembly 10 includes a backing plate 12. A wheel brake is generally shown at 14 in FIG. 2a where the backing plate 12 secures the assembly 10 to a piston 16 of a caliper 18. The piston 16 actuates the assembly 10 into engagement with a brake disc 20 for stopping a vehicle as is known in the art of wheel brakes. A typical wheel brake 14 includes opposing assemblies 10 for engaging two sides of the brake disc 20 for stopping the vehicle.

The assembly 10 includes a friction pad 24 overlaying the backing plate 12. The friction pad 24 contacts the brake disc 20 when the assembly 10 is actuated into engagement with the brake disc 20 by the piston 16. As is known in the art, the vehicle is stopped due to the frictional forces between the friction pad 24 and the brake disc 20. The friction pad 24 comprises a composite material known to withstand the frictional forces between the pad 24 and the brake disc 20. However, friction pad 24 has sometimes had difficulty withstanding the heat and stresses derived while stopping a vehicle and has sometimes cracked and chipped over time.

To enhance the durability of the friction pad 24, the assembly 10 includes an engagement panel 26 disposed between the backing plate 12 and the friction pad 24 for securing the friction pad 24 to the backing plate 12. The engagement panel 26 comprises a rigid material such as, for example steel or an equivalent, that strengthens the friction pad 24 and absorbs stress created while stopping the vehicle that would otherwise be absorbed solely by the pad 24. The engagement panel 26 forms a rigid frame for the friction pad 24 for providing structural support to the friction pad 24. Thus, the engagement panel 26 lengthens the life of the friction pad 24 by reducing cracking of the pad 24 as is typical for a conventional brake disc assembly.

As shown in FIG. 1, backing plate 12 includes at least one alignment pin 28 for aligning the engagement panel 26 with the backing plate 12. Four alignment pins 28 are illustrated disposed upon the backing plate 12, although other numbers may be used. The engagement panel 26 includes at least one alignment aperture 30 for receiving the alignment pins 28. The alignment pins 28 function as an assembly aid. The alignment pins 28 and alignment apertures 30 allow an assembly technician to position the engagement plate 26 on backing plate 12 in a mold, i.e. the engagement plate 26 is self aligning with the backing plate 12.

Figure 2B:
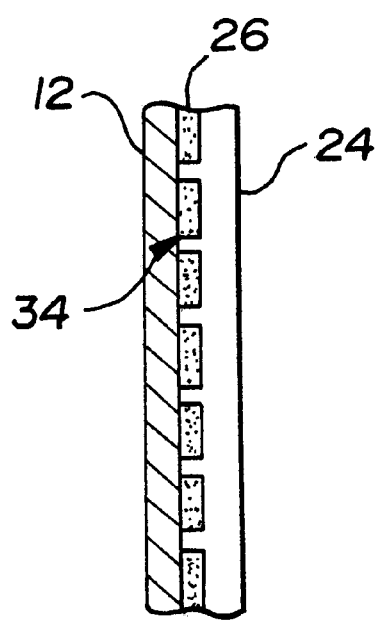
FIG. 2b is a sectional view of the brake lining assembly showing the friction pad molded onto both the backing plate and the engagement plate.

The engagement panel 26 includes at least one area 32 facilitating engagement of the engagement panel 26 to the backing plate 12. The exact location of the area 32 is not important to the subject concept. Alternative types of links for securing the engagement panel 26 to the backing plate 12 include welds, brazed joints and mechanical attachments. After securing the backing plate 12 to the engagement panel 26 the two are inserted into a mold tool for forming the friction pad 24. Subsequently, the composite material comprising the friction pad 24 is injected into the mold tool in liquid form as is known in the art of injection molding. The friction pad 24 is molded into mating engagement with the engagement apertures 34 disposed within the engagement panel 26. As shown in FIG. 2b, the friction pad material extends through the engagement apertures 34 and into mating engagement with the engagement panel 26.

Figure 3:
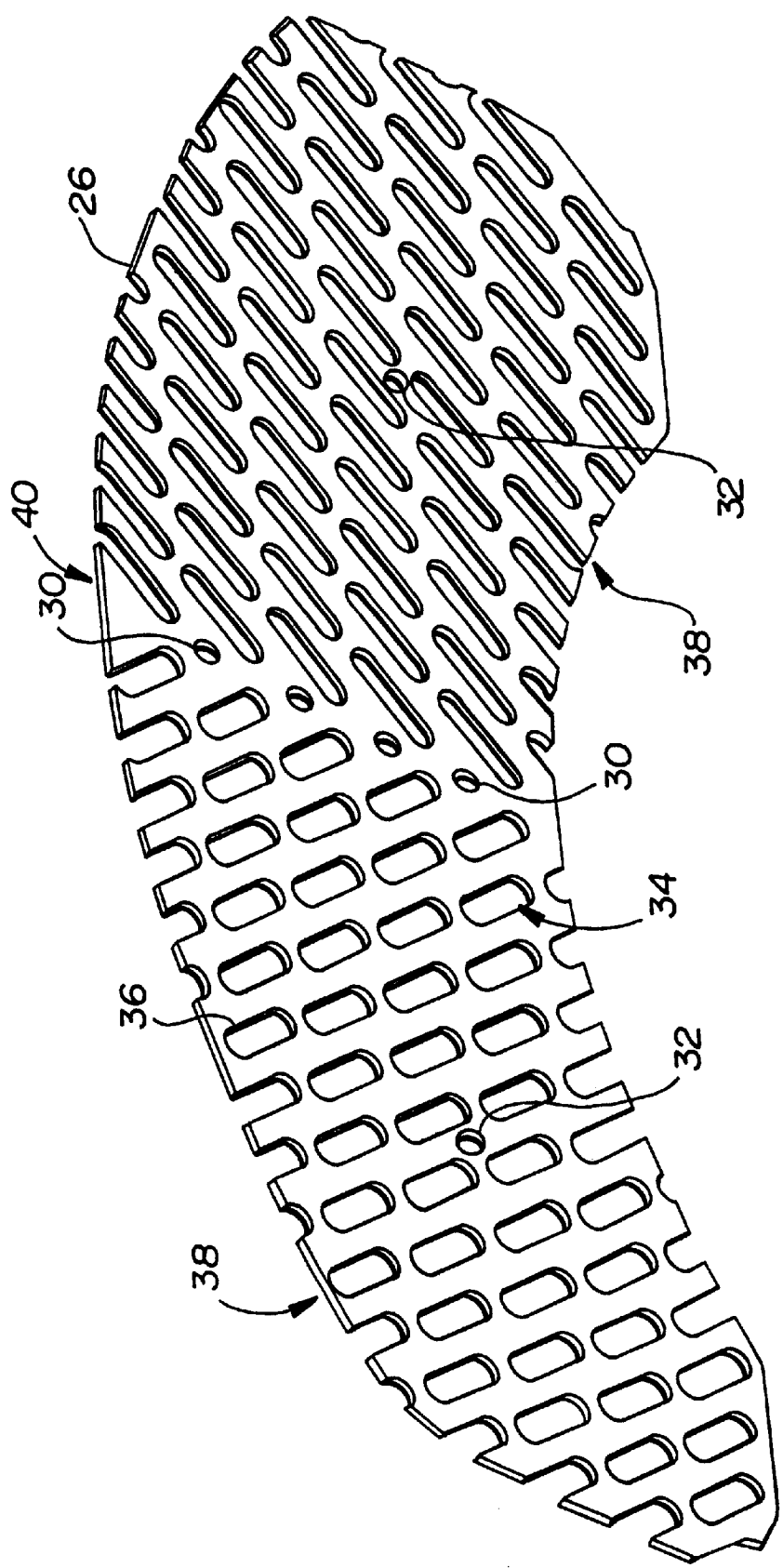
FIG. 3 is perspective view of the engagement panel of the subject invention.

As shown in FIG. 3, the plurality of engagement apertures 34 are preferably formed into a desired pattern. As shown, apertures 34 preferably have side walls 36 extending at an angel relative to a centerline 40. The engagement apertures 34 may take other forms such as, for example, circles, squares, or combinations thereof. The side walls 36 of apertures 30 are aligned in a pattern of rows 38. The engagement panel 26 defines a centerline 40 having opposing acute and obtuse patterns of rows 38 relative to the centerline 40. The acute and obtuse patterns of rows 38 are disposed on opposite sides of the centerline 40 presenting the form of a chevron. The pattern, generally extending in opposed directions about centerline 40, spreads any forces on panel 26 to opposed sides of centerline 40 in a generally symmetrical pattern. This tends to cancel the opposed forces.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A brake assembly for a vehicle braking system comprising:
   a backing plate;
   a friction pad overlying said backing plate; and
   an engagement panel disposed between said backing plate and said friction pad for securing said friction pad to said backing plate, said engagement panel having a plurality of engagement apertures disposed therein with the surface area of said panel being greater than the space defined by said engagement apertures and said friction pad extending through said aperture and towards said backing plate;
   wherein said plurality of engagement apertures have angled side walls; wherein said angled side walls of said plurality of engagement apertures are aligned in a pattern of rows.

2. An assembly as set forth in claim 1, wherein said friction pad is molded onto a combination of said backing plate and said engagement panel.

3. An assembly as set forth in claim 2, wherein said panel forms a rigid frame for said friction pad for providing structural support to said friction pad.

4. An assembly as set forth in claim 1, wherein there are opposing acute and obtuse patterns of rows of said engagement apertures spaced on opposed sides of a centerline of said panel.

5. An assembly as set forth in claim 1, wherein said backing plate includes at least one alignment pin for aligning said panel with said backing plate.

6. An assembly as set forth in claim 5, wherein said engagement plate includes at least one alignment aperture for receiving said at least one alignment pin.

7. An assembly as set forth in claim 1, wherein said engagement plate includes at least one area for facilitating attachment of said engagement plate to said backing plate.

8. An assembly as set forth in claim 7, wherein said panel is attached by one of welding, brazing, staking, riveting, and screwing said panel to said backing plate.

9. A brake assembly for a vehicle braking system comprising:
   a backing plate;
   a friction pad overlying said backing plate;
   an engagement panel disposed between said backing plate and said friction pad for securing said friction pad to said backing plate, said engagement panel having a plurality of engagement apertures with angled side walls disposed therein with the surface area of said panel being greater than the space defined by said engagement apertures, said apertures being aligned in a pattern of rows forming opposing acute and obtuse patterns spaced on opposed sides of a centerline of said panel; and
   said friction pad extending through said apertures in said panel and towards said backing plate, whereby said friction pad is molded onto a combination of said backing plate and said friction pad so that said panel forms a rigid frame for said friction pad.

10. A brake lining for a wheel brake of a vehicle braking system comprising:
    a backing plate;
    a friction pad overlying said backing plate;
    an engagement panel disposed between said backing plate and said friction pad defining a vertically extending centerline, said engagement panel having a first plurality of engagement apertures on one side of said centerline with each of said first plurality of engagement apertures extending at a first angle relative to said centerline and a second plurality of engagement apertures on an opposite side of said centerline with each of said second plurality of engagement apertures extending at a second angle relative to said centerline wherein said first angle extends upwardly to the right relative to said centerline and said second angle extends upwardly to the left relative to said centerline.

11. A lining as set forth in claim 10 wherein said first plurality of engagement apertures are aligned in a first pattern of rows and said second plurality of engagement apertures are aligned in a second pattern of rows that are symmetrically formed with respect to said first pattern of rows about said centerline.

12. A lining as set forth in claim 10 wherein said engagement panel forms a rigid frame.

13. A lining as set forth in claim 10 wherein the surface area of said panel is greater than the space defined by said engagement apertures.

14. A lining as set forth in claim 10 wherein each of said first and second plurality of engagement apertures have a common shape.

15. A lining as set forth in claim 14 wherein said common shape is an oval slot.

16. A lining as set forth in claim 10 wherein each of said first angles are parallel to each other and wherein each of said second angles are parallel to each other.

* * * * *